US009253332B2

(12) United States Patent
Dye et al.

(10) Patent No.: US 9,253,332 B2
(45) Date of Patent: *Feb. 2, 2016

(54) VOICE CONFERENCE CALL USING PSTN AND INTERNET NETWORKS

(71) Applicant: VPN Multicast Technologies LLC, Plano, TX (US)

(72) Inventors: Thomas Dye, Austin, TX (US); Thomas Dundon, San Marcos, TX (US)

(73) Assignee: VPN Multicast Technologies LLC, Plano, TX (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/674,227

(22) Filed: Nov. 12, 2012

(65) Prior Publication Data

US 2013/0163480 A1    Jun. 27, 2013

Related U.S. Application Data

(63) Continuation of application No. 12/646,892, filed on Dec. 23, 2009, now Pat. No. 8,339,997, which is a continuation of application No. 10/796,560, filed on Mar. 9, 2004, now Pat. No. 7,664,056.

(60) Provisional application No. 60/453,307, filed on Mar. 10, 2003.

(51) Int. Cl.
*H04L 12/66* (2006.01)
*H04M 3/56* (2006.01)
(Continued)

(52) U.S. Cl.
CPC ........... *H04M 3/568* (2013.01); *H04L 12/1818* (2013.01); *H04L 12/4641* (2013.01);
(Continued)

(58) Field of Classification Search
CPC ....... H04M 3/56; H04M 3/561; H04M 7/006; H04L 29/06027; H04L 49/25; H04Q 2213/13204
USPC .......................... 370/260–263, 265, 352–356
See application file for complete search history.

(56) References Cited

U.S. PATENT DOCUMENTS 5,805,805 A    9/1998 Civanlar et al.
6,041,166 A    3/2000 Hart et al.
(Continued)

FOREIGN PATENT DOCUMENTS

WO    WO 01/91397 A2    11/2001
WO    WO 02/098063 A1    12/2002
WO    WO 03003665 A1    1/2003

OTHER PUBLICATIONS

Higgins, L. et al., "Tunneling Multicast Traffic Through Non-Multicast Aware Networks and Encryption Devices," MILCOM 2001. Proceedings. Communications for Network-Centric Operations: Creating the Information Force, McLean, VA Oct. 28-30, 2001; IEEE Military Communications Conference, New York, NY: IEEE, US, vol. 1 of 2, Oct. 28, 2001, pp. 296-300.

(Continued)

*Primary Examiner* — Suhan Ni
(74) *Attorney, Agent, or Firm* — Martin & Ferraro, LLP (57) ABSTRACT

A system and method for supporting a multi-participant voice conference call using PSTN and Internet networks is described. The method for supporting a multi-participant voice conference call includes receiving voice from a PSTN client. The method also includes receiving voice data from a moderator and from at least one remote client connected to the Internet. The method then proceeds to mix the voice data from the PSTN client with the voice data from the moderator into a first mixed voice data that is transmitted to the remote client that is connected to the Internet. The method also mixes the voice data from the moderator with the voice data from the remote client connected to the Internet into a second mixed voice data that is transmitted to the PSTN client.

12 Claims, 6 Drawing Sheets

(51) Int. Cl.
  *H04N 7/15* (2006.01)
  *H04L 12/18* (2006.01)
  *H04L 12/46* (2006.01)
  *H04L 29/06* (2006.01)
  *H04M 7/12* (2006.01)
  *H04M 7/00* (2006.01)

(52) U.S. Cl.
  CPC ...... *H04L29/06027* (2013.01); *H04L 65/1009* (2013.01); *H04L 65/4038* (2013.01); *H04M 3/567* (2013.01); *H04M 7/1225* (2013.01); *H04N 7/15* (2013.01); *H04M 7/009* (2013.01); *H04M 2207/35* (2013.01)

(56) References Cited

U.S. PATENT DOCUMENTS

| | | | |
|---|---|---|---|
| 6,047,325 | A | 4/2000 | Jain et al. |
| 6,298,062 | B1 | 10/2001 | Gardell |
| 6,526,056 | B1 | 2/2003 | Rekhter et al. |
| 6,640,251 | B1 | 10/2003 | Wiget et al. |
| 6,728,358 | B2* | 4/2004 | Kwan ........................ 370/260 |
| 6,751,477 | B1 | 6/2004 | Alperovich et al. |
| 6,778,531 | B1 | 8/2004 | Kodialam et al. |
| 6,788,681 | B1 | 9/2004 | Hurren et al. |
| 6,870,842 | B1 | 3/2005 | Caronni et al. |
| 6,977,929 | B1 | 12/2005 | Caronni et al. |
| 6,981,022 | B2 | 12/2005 | Boundy |
| 7,203,957 | B2 | 4/2007 | Balissat et al. |
| 7,281,058 | B1 | 10/2007 | Shepherd et al. |
| 7,330,468 | B1 | 2/2008 | Tse-Au |
| 7,339,929 | B2 | 3/2008 | Zelig |
| 7,366,894 | B1 | 4/2008 | Kalimuthu et al. |
| 7,444,425 | B2 | 10/2008 | Lehmann et al. |
| 7,447,203 | B2 | 11/2008 | Chen et al. |
| 7,447,901 | B1 | 11/2008 | Sullenberger et al. |
| 7,461,157 | B2 | 12/2008 | Ahlard |
| 7,562,386 | B2 | 7/2009 | Balissat et al. |
| 7,564,834 | B1* | 7/2009 | Suder et al. ............... 370/352 |
| 7,570,648 | B2 | 8/2009 | Hu et al. |
| 7,653,192 | B1 | 1/2010 | Sylvain |
| 7,664,056 | B2 | 2/2010 | Dye |
| 7,724,744 | B2 | 5/2010 | Shur et al. |
| 7,830,787 | B1 | 11/2010 | Wijnands et al. |
| 8,339,997 | B2 | 12/2012 | Dye |
| 8,477,778 | B2 | 7/2013 | Lehmann et al. |
| 2002/0016926 | A1 | 2/2002 | Nguyen |
| 2002/0029350 | A1 | 3/2002 | Cooper et al. |
| 2003/0110288 | A1 | 6/2003 | Ramanujan et al. |
| 2003/0137976 | A1 | 7/2003 | Zhu et al. |
| 2003/0147392 | A1 | 8/2003 | Hayashi et al. |
| 2003/0235338 | A1 | 12/2003 | Dye |
| 2004/0022322 | A1 | 2/2004 | Dye |
| 2006/0039388 | A1 | 2/2006 | Shur et al. |
| 2010/0228879 | A1 | 9/2010 | Wiget et al. |
| 2011/0043601 | A1 | 2/2011 | Dye |
| 2013/0162754 | A1 | 6/2013 | Dye |

OTHER PUBLICATIONS

International Search Report, International Application No. PCT/US2004/007341, mailed Sep. 7, 2004.
International Telecommunications Union Recommendation H.323, Titled "Packet Based Multimedia Communication System," Nov. 2000, 258 pages.
International Telecommunications Union Recommendation H.261, Titled "Video Codec for Audio Visual Services at Px64 kbps," Mar. 1993, 29 pages.
International Telecommunications Untion Recommendation H.263, Titled "Video Coding for Low Bit-Rate Communications," Feb. 1998, 167 pages.
U.S. Appl. No. 14/590,791, filed Jan. 2015, Dye.
*VPN Multicast Technologies LLC v. AT&T Inc. and AT&T Corporation*; Complaint; Case No. 2:14-cv-1013; Oct. 31, 2014; 8 pages.

*VPN Multicast Technologies LLC v. Dimension Data North America, Inc., Dimension Data Holdings PLC, and Dimension Data, LLC*; Complaint; Case No. 2:14-cv-1014; Oct. 31, 2014; 8 pages.
*VPN Multicast Technologies LLC v. AT&T Inc. and AT&T Corporation; VPN Multicast Technologies LLC v. Dimension Data North America, Inc., Dimension Data Holdings PLC, and Dimension Data, LLC*; Dimension Data North America, Inc.'s Answer and Affirmative Defenses to Plaintiff's First Amended Complaint; Case Nos. 2:14-cv-1013 and 2:14-cv-1014; Jan. 29, 2015; 15 pages.
*VPN Multicast Technologies LLC v. AT&T Corp.; VPN Multicast Technologies LLC v. Dimension Data North America, Inc., et al.*, Plaintiff's Responses to Defendants' First Set of Common Interrogatories to VPN Multicast Technologies LLC, Case Nos. 2:14-cv-1013 and 2:14-cv-1014, Apr. 14, 2015, 28 pgs.
*VPN Multicast Technologies LLC v. AT&T Corp.; VPN Multicast Technologies LLC v. Dimension Data North America, Inc., et al.*; Defendants' Invalidity Contentions including Appendix A and Claim Charts; Case Nos. 2:14-cv-1013 and 2:14-cv-1014; Apr. 16, 2015; 2,274 pages.
*VPN Multicast Technologies LLC v. AT&T Corp.; VPN Multicast Technologies LLC v. Dimension Data North America, Inc., et al.*; AT&T's Objections and Responses to VPN's First Set of Common Interrogatories; Case Nos. 2:14-cv-1013 and 2:14-cv-1014; Apr. 23, 2015; 20 pages.
Alchaal et al., "Offering a Multicast Delivery Service in a Programmable Secure IP VPN Environment," Fourth International Workshop on Networked Group Communication (NGC '02), 2002, 6 pgs.
Bokun et al., "The MECCANO Internet Multimedia Conferencing Architecture," Multimedia Education and Conferencing Collaboration over ATM Networks and Others (MECCANO), Ver. 3.1.2, Dec. 1999, 67 pgs.
Cisco Systems, Inc., "Multicast VPN Design Guide—Cisco Systems," Aug. 9, 2003, 25 pgs.
Cisco Systems, Inc., "Multicast VPN—IP Multicast Support for MPLS VPNs," 2002, 86 pgs.
Cisco Systems, Inc., "Networkers: Multicast Support for MPLS/BGP VPNs: RST-322," cisco.com, 2001, 89 pgs.
Comer, "Internetworking with TCP/IP vol. I: Principles, Protocols, and Architecture," Third Edition, Mar. 1995, 628 pgs.
Costa et al., "An Introduction to Virtual Private Networks: Towards D-VPNs," Network and Information Systems Journal, vol. 2, Jun. 2000, 20 pgs.
Eriksson, "MBONE: The Multicast Backbone," ACM Communications of the ACM 37, Aug. 8, 1994, pp. 54-60, 11 pgs.
Finlayson, "The UDP Multicast Tunneling Protocol," Network Working Group, Internet Draft, Nov. 19, 1997, 6 pgs.
Higgins, L. et al. "Tunneling Multicast Traffic Through Non-Multicast A ware Networks and Encryption Devices," MILCOM 2001. Proceedings. Communications for Network-Centric Operations: Creating the Information Force. McLean, VA Oct. 28-30, 2001: IEEE Military Communications Conference. New York, NY: IEEE, US. vol. 1 of 2, Oct. 28, 2001. pp. 296-300.
Kent et al., "Security Architecure for the Internet Protocol," Network Working Group, Request for Comments: 2401, Obsoletes: 1825, Category: Standards Track, Nov. 1998, 61 pgs.
Kirstein et al., "The RadioActive Networking Architecture," IEEE, DARPA Active Networks Conference and Exposition, 2002. Proceedings, May 2002, 16 pgs.
Kumar, "MBone: Interactive Multimedia on the Internet," New Riders Publishing, 1996, 242 pgs.
Labonte et al., "Group Management Strategies for Secure Multicasting on Active Virtual Private Networks," IEEE, 25th annual IEEE Conference on Local Computer Networks, pp. 213-222, Nov. 2000, 10 pgs.
Lamaster et al., "Internet technologies and requirements for telemedicine," Minimally Invasive Therapy and Allied Technologies 1997, vol. 8, No. 5-6, pp. 436-443, 1997, 8 pgs.
Macedonia et al., "MBone Provides Audio and Video Across the Internet," U.S. Naval Post Graduate School Website, available at http://www.nps.edu/library, Apr. 1994, 8 pgs.

(56) References Cited

OTHER PUBLICATIONS

Rosen et al., "Multicast in MPLS/BGP VPNs," Network Working Group, Internet Draft, Nov. 2000, 17 pgs.

Savetz et al., "MBONE: Multicasting Tomorrow's Internet," IDG Books Worldwide, Inc., 1996, 259 pgs.

Waitzman et al., "Distance Vector Multicast Routing Protocol," Networks Working Group, Request For Comments: 1075, Nov. 1988, 24 pgs.

Wittmann et al., "Multicast Communication: Protocols and Applications," Morgan Kaufmann Publishers, 1999, 362 pgs.

* cited by examiner

VOICE CONFERENCE CALL USING PSTN AND INTERNET NETWORKS

PRIORITY CLAIM

This application is a continuation of U.S. patent application Ser. No. 12/646,892, filed Dec. 23, 2009, which is a continuation of U.S. patent application Ser. No. 10/796,560, now U.S. Pat. No. 7,664,056, filed Mar. 9, 2004, which claims priority of U.S. Provisional Application No. 60/453,307, filed Mar. 10, 2003; wherein all of the above referenced applications are incorporated by reference in their entirety.

BACKGROUND OF THE INVENTION

1. Field of the Invention

The present invention relates to computer system architectures and more particularly to audio and video telecommunications for collaboration over hybrid networks.

2. Description of the Related Art

Since their introduction in the early 1980's, audio/video conferencing systems ("video conferencing systems") have enabled users to communicate between remote sites using telephone lines based on dedicated or switched networks. Recently, technology and products to achieve the same over Internet Protocol have been attempted. Many such systems have emerged on the marketplace. Such systems produce low-frame-rate and low quality communications due to the unpredictable nature of the Internet. Such connections have been known to produce long latencies with limited bandwidth, resulting in jerky video, dropped audio and loss of lip sync.

Therefore, most video conferencing solutions have relied on dedicated switched networks such as T1/T3, ISDN or ATM. These systems have the disadvantage of higher cost and complexity and a lack of flexibility due largely to interoperability issues and higher cost client equipment. High costs are typically related to expensive conferencing hardware and dedicated pay-per-minute communications usage. Most often these dedicated communications circuits are switched circuits which use a fixed bandwidth allocation.

In most prior art systems the public switched telephone network (PSTN) is used to transfer audio during conferencing and collaboration with remote parties. It is known that quality of audio reception is poor over typical prior art Internet protocol (IP) systems. Prior art audio/video conferencing systems which use IP networks for audio and video transport lack the ability to terminate audio to client end systems through both PSTN and IP networks. Thus, it is desirable to achieve a hybrid mix of audio and video data over PSTN and IP-based audio/video conferencing to achieve full duplex real-time operation for all conference participants.

Figure 1:
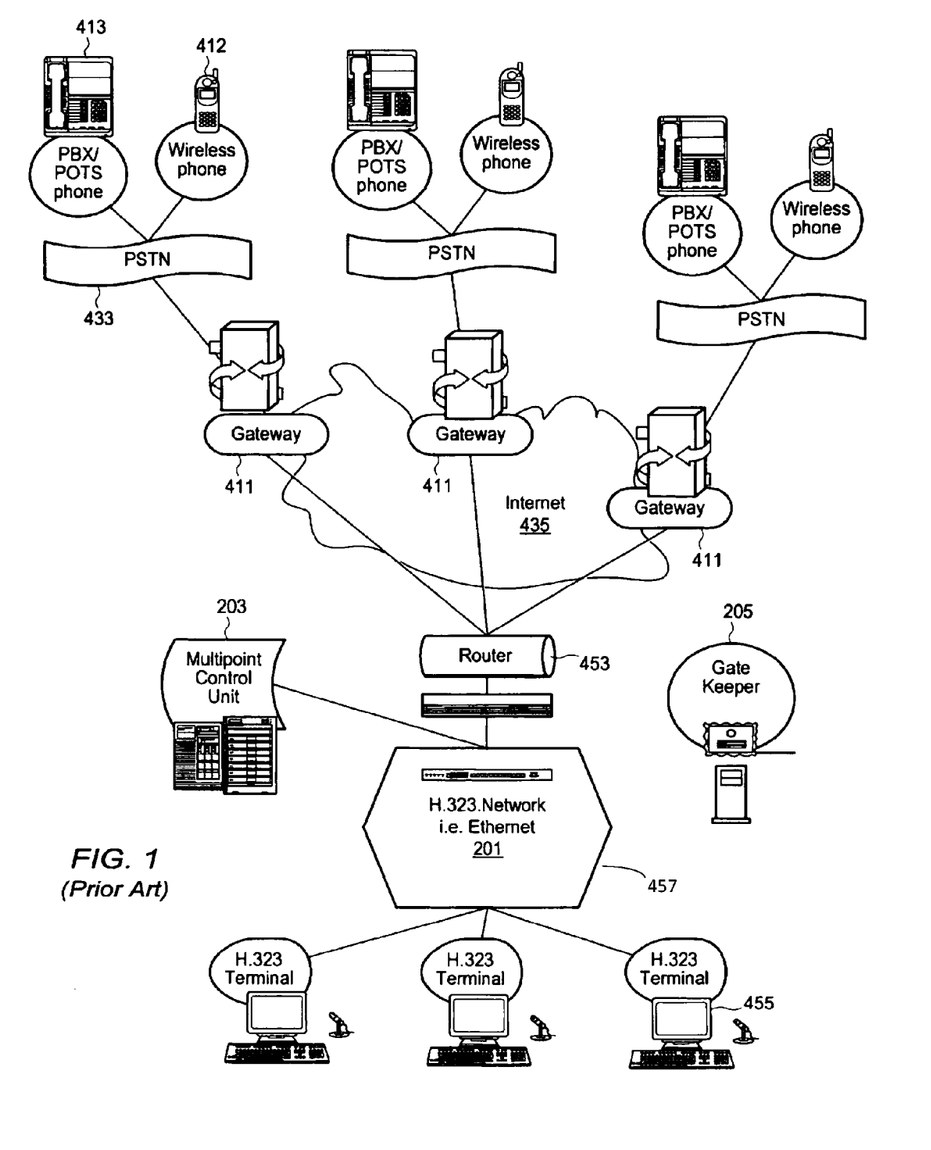
FIG. 1 illustrates a typical H.323 audio and video conferencing system implemented in accordance with prior art.

Modem voice over IP telephony systems have used the H.323 standard from the international telecommunications union (1 TU). The H.323 standard focuses on the transmission of audio and video information through the Internet or switched private networks. FIG. 1 illustrates a prior art H.323 system. The block diagram of FIG. 1 includes a number of major components, including the general Internet 435, Internet H.323 bridges or gateways 411, telecommunications PSTN 433 (Public Switched Telephone Network), wireless and land-line phone handsets 412/413, standard Internet router 453, an optional gatekeeper 205, a multipoint control unit 203, a standard local area network 457, a voice over IP server running the H.323 protocol 201, and multiple I/O and display terminals 455. FIG. 1 is an example of the prior art conferencing system used between hybrid networks connecting the PSTN and Internet. Hybrid networks are used to communicate audio on internal LAN and WAN networks as well as transfer of audio to the existing telephone or PSTN network. While the H.323 recommendation allows for video conferencing, the prior art systems use private switched networks to establish transport that require expensive H.323 bridges between dedicated networks and the PSTN. Each of the components in FIG. 1 serves this purpose to achieve audio telecommunications between multiple parties.

Referring again to FIG. 1, the components of FIG. 1 are interconnected as follows. Prior art technology uses PC or client terminals 455 connected through a local area network 457 to either a data server or a specialized audio/video server 201. The network server 201 contains the application necessary to generate the H.323 network protocol. The data server 201 may be connected to a local gatekeeper 205 that is responsible for management control functions. As known the gatekeeper 205 is responsible for various duties such as admission control, status determination, and bandwidth management. Data server 201 functions are specified and handled through the ITU-H.225.0RAS recommendations. In addition, management control unit (MCU) 203 is connected to the data server 201. The multipoint control unit of a 203 is required by the eight-step ITU-5 H.323 recommendation for flexibility to negotiate end points and determine compatible setups for any conference media correspondents. The multipoint control unit 203 enables communication between three or more end points. Similar to a multipoint bridge, the gatekeeper 205 and the multipoint control unit 203 are optional components of the H.323 enabled network. Another useful job of the multipoint control unit 203 is to determine whether to unicast or multicast the audio or video streams. As known by one skilled in the art, these decisions are dependent on the capability of the underlying network and the topology of the multipoint conference. The multipoint control unit 203 determines the capabilities of each client terminal 455 and status each of media stream.

Again referring to FIG. 1, a standard network router 453 is connected between the local area network 457 and the Internet 435. At the outer edges of the Internet, "points of presence" are located at multiple end points or call termination sites. Gateways 411 are used to the transcode the H.323 network information onto the PSTN 433. Standard telephone handsets 413 or wireless phones 412 are connected to the PSTN telephony system.

Figure 2:
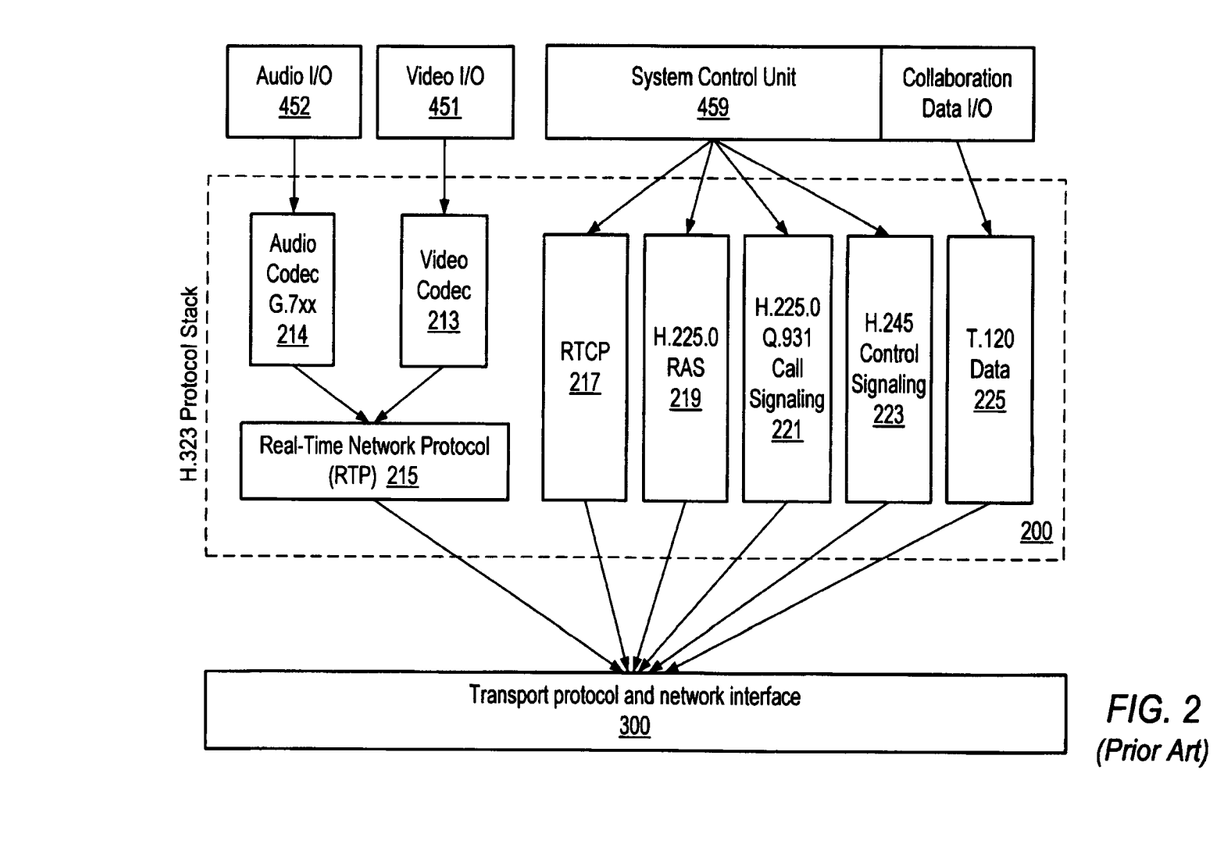
FIG. 2 illustrates an H.323 protocol stack and its components implemented in accordance with prior art.

FIG. 2 illustrates the embodiment of the H.323 protocol stack 200, its components and their interfaces to the local area network computers at the network interface 300. The input and control devices 455 along with a local area network 457 of FIG. 1 are shown in FIG. 2, consisting of the audio input output block 452, the video input and output block 451, the system control unit and data collaboration unit 459. These input devices are largely responsible for the delivery of media data to the H.323 protocol stack 200 shown in FIG. 2.

Again referring to FIG. 2, the sub blocks of functionality that make up the H.323 protocol stack 200 is described. The H.323 protocol stack consists of an audio codec 214, and a video CoDec 213 connected to the audio/video input and output blocks 452 and 451, respectively. The audio and video CoDecs are responsible for compression and decompression of the audio and video sources. The real-time network protocol component 215 is connected to the audio video CoDecs and is also responsible for preparation of the media data for transport according to the RTP (real-time protocol) recommendations.

Again referring to the prior art system of FIG. 2, the H.323 protocol stack has a system control unit 459 which connects to multiple control blocks within the H.323 protocol stack 200. The system control unit connects to the RTC Protocol block 217 for real time transport of the control information used to set-up and tear down the conference. The system control unit 459 also connects to the call-signaling units 221 and 219 for call signaling protocols and media stream packetization application used for packet-based multimedia communications. The system control unit 459 also connects to the control signaling block 223 used for control of protocols for multimedia communications. Lastly, the H.323 recommendation defines a data collaboration capability as known and outlined in the T.120 data collaboration unit 225.

All of the defined blocks make up the H.323 protocol network interface to the Transport protocol and network interface unit 300 for transport of data through the modem or router 453 to the Internet 435.

SUMMARY OF THE INVENTION

A system and method for supporting a multi-participant voice conference call using PSTN and Internet networks is described. The method for supporting a multi-participant voice conference call includes receiving voice from a public switched telephone network (PSTN) client. The method also includes receiving voice data from a moderator and from at least one remote client connected to the Internet. The method then proceeds to mix the voice data from the PSTN client with the voice data from the moderator into a first mixed voice data that is transmitted to the remote client that is connected to the Internet. The method also mixes the voice data from the moderator with the voice data from the remote client connected to the Internet into a second mixed voice data that is transmitted to the PSTN client.

A system for supporting a multi-participant voice conference call is also described. The system includes an audio mixer, a first transport output, a VOIP mixer and a second transport output. The audio mixer mixes voice data from a Public Switched Telephone Network (PSTN) client with voice data from a moderator into a first mixed voice data. The first transport output transmits the first mixed voice data to at least one remote client. The VOIP mixer mixes voice data from the moderator with voice data from the remote client connected to the Internet into a second mixed voice data. The second transport output transmits the second mixed voice data to the PSTN client.

Another system for supporting a multi-participant voice conference call that includes a PSTN client, a first participant client, at least one remote client, a first audio mixer and a second audio mixer is described. The PSTN client, the first participant, and each remote client device are each configured to receive audio. The first audio mixer mixes the audio from the PSTN client with the audio from the first participant into a first mixed audio. The first mixed audio is transmitted to each one remote client connected to the Internet. The second audio mixer mixes audio from the first participant with the audio from each remote client connected to the Internet into a second mixed audio. The second mixed audio is transmitted to the PSTN client.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following applications and references are hereby incorporated by reference as though fully and completely set forth herein.

U.S. application Ser. No. 10/446,407 titled "Transmission Of Independently Compressed Video Objects Over Internet Protocol", Dye et al. filed May 28, 2003

U.S. application Ser. No. 10/620,684 titled "Assigning Prioritization During Encode Of Independently Compressed Objects, Dye, et al. filed on Jul. 16, 2003.

International Telecommunications Union Recommendation H.323, Titled "Packet Based Multimedia Communication System." November, 2000

International Telecommunications Union Recommendation H.261, Titled "Video Coding for Audio Visual Services at Px64 kbps."

International Telecommunications Union Recommendation H.263, Titled "Video Coding for Low Bit-Rate Communications" February, 1998

One embodiment of the present invention uses a decentralized model for multipoint conferencing. The multipoint control unit insures communication capability once the media stream is transcoded to the H.323 standard as known. However, this embodiment mixes media streams at each terminal prior to multicast.

Figure 3:
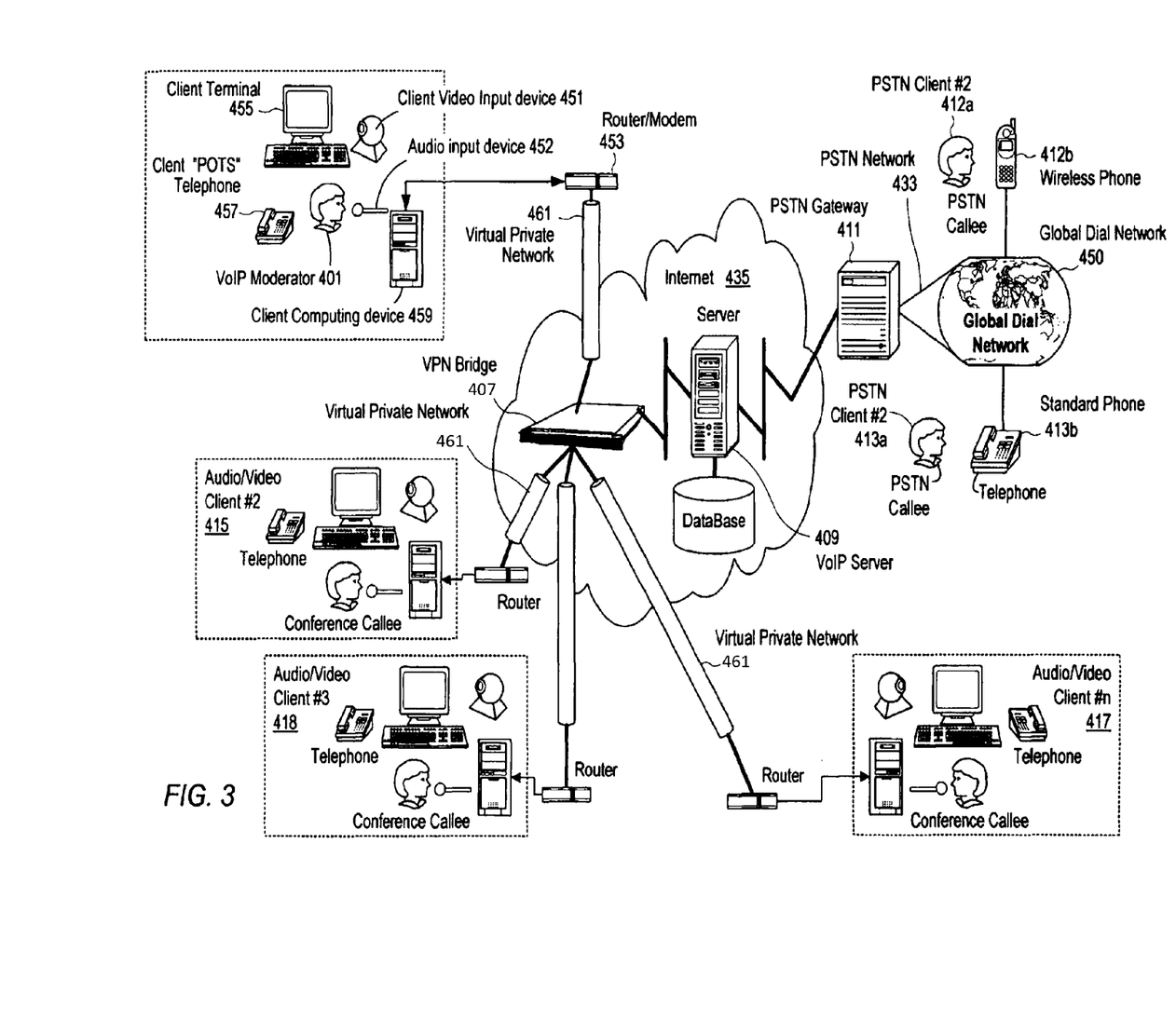
FIG. 3 illustrates one embodiment of the present invention.

FIG. 3 illustrates one embodiment of the invention. This embodiment allows audio video and data collaboration information to be securely transferred between a plurality of local and remote clients preferably within a virtual private network. This embodiment provides the ability for a moderator (single member of the conference) to dial out from a desktop computer or terminal (using a novel hybrid network structure) connecting an external telephone user's audio into the audio/video conference. The embodiment integrates full duplex audio, video, and data connections between clients conferencing on the Internet and clients conferencing on standard telephone systems. The Internet/PSTN hybrid network is the medium used for transport. FIG. 3 depicts the necessary equipment and protocols to complete the dial out to PSTN network method and process.

Now referring to FIG. 3, the voice over IP moderator 401 (call initiator or caller) typically has a number of peripherals used for real input output devices at the desktop. These include a client computing devices such as a PC or other computer 459, a client terminal 455 including a keyboard and mouse for input output control, a standard desktop telephone 457, a video input device or camera 451 and the audio input device, microphone 452. In one embodiment each conference call connected to the Internet will have similar peripheral hardware devices. FIG. 3 illustrates a multi-party virtual conference connected over the Internet. Internet clients include audio video client 415, audio video client 418, and audio video client number and 417. In addition, FIG. 3 shows two possible telephony clients using standard wired 413 or wireless telephone 412 systems. PSTN client #1 412 is connected to a wireless cell phone that in turn is connected to the global dial network 450, as specified by the PSTN 433. Remote telephony user client #2 413 is connected to a standard telephone handset 413 which is connected to the global dial network 450 based on the PSTN 433.

Again referring to FIG. 3 the Internet-based clients 401, 415, 418, and 417 are connected through routers or modems 453 preferably in a virtual private network configuration 461. A virtual private network bridge 461 is used to connect local and remote clients together within a secure private network. A local connection from the VPN bridge 407 to the voice over IP server 409 is used to transfer conference audio from any participant on the IP network to any participant in the PSTN. Thus, the voice over IP server 409 is responsible for transcoding audio information from the virtual private network 461 to and from the PSTN gateway 411, thus bridging the PSTN and VPN together.

Figure 4:
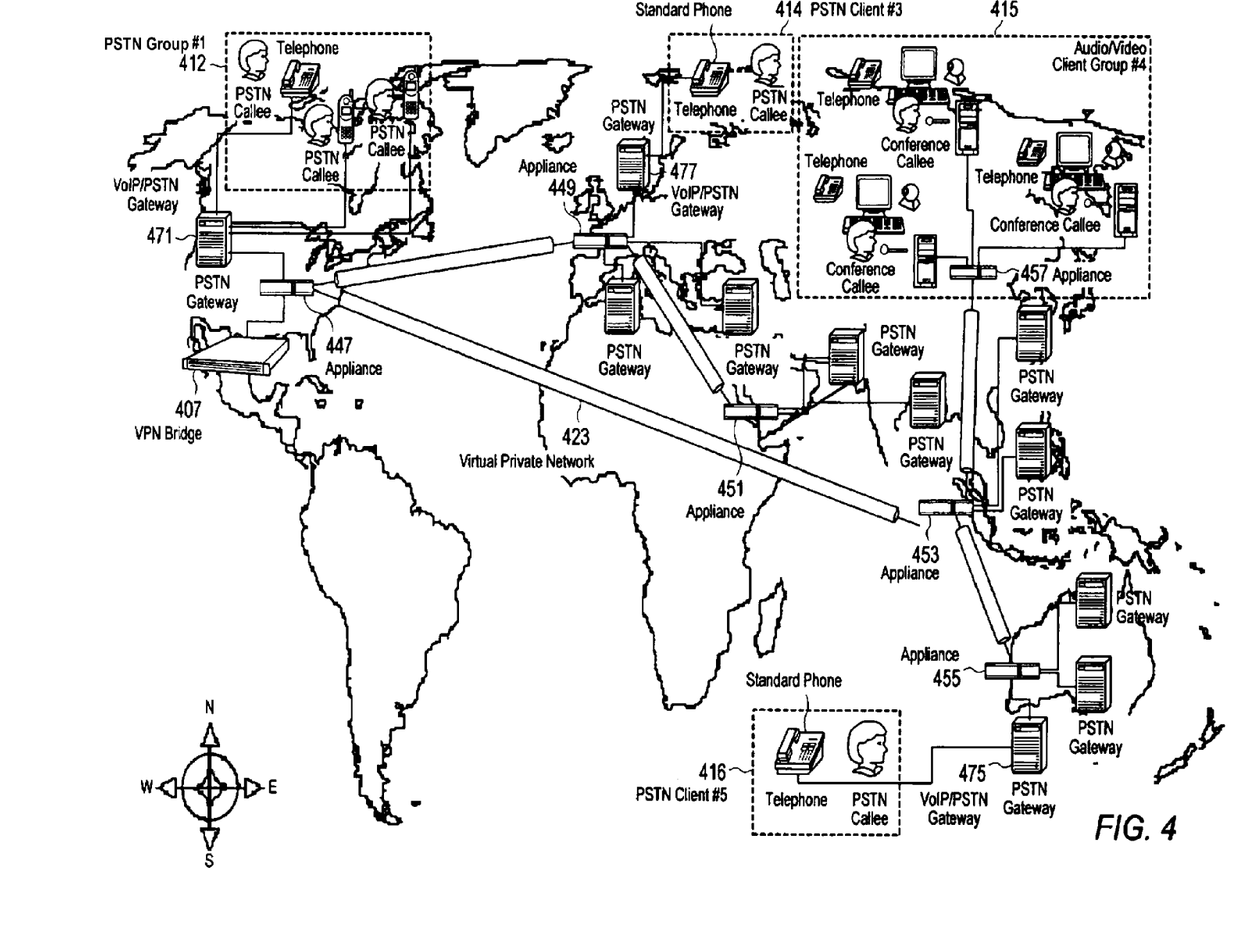
FIG. 4 illustrates an embodiment using multicast Protocol.

FIG. 4 illustrates one embodiment of the present invention. The system of FIG. 4 performs audio transport between multiple client groups who all share the same multicast group address such that audio/video and data may be shared interactively without the need of central servers. Multicast protocol and encapsulated media packets are implemented so that media data may be routed through public or private IP networks without the need for special hardware and software during the majority of the network transport. FIG. 4 shows a system of virtual networks that interconnect as a virtual private network 423. Each VPN tunnel can be connected in a series or star topology between one or more multicasting appliances 447-457. One or more central servers or VPN bridge(s) 407 are at the center of the network topology. Multicasting enabled appliances 447, 449, 451, 453, 455, and 457 are used at the origination or termination points for audio, video, or data (media data) to and from the backbone of the transport path. PSTN gateways are used to provide "points of presence" throughout and are responsible for origination or termination of audio data on and off of the PSTN from the IP network topology. Multicast enabled routing allows remote clients to be PC's or PSTN gateways which become "Listeners" of media data. Thus, media data is presented or broadcast onto a network with one or more group addresses. This method uses less bandwidth and reduces latency during transport.

Again referring to FIG. 4, PSTN group #1 412 has three analog telephones which are switched into a PSTN gateway and VoIP server 471 which is networked over public or private network connection to a multicast enabled VPN appliance 447. Appliance 447 is connected to a VPN bridge server 407 also by means of a virtual private network. The VPN Bridge 407 is used to authenticate clients, assign multicast IP group addresses to various PC clients and VoIP gateway servers. In addition the VPN Bridge Server 407 may have additional meeting room or conferencing features necessary to carry out a multi-party conference. Connected to the VPN Bridge 407 are various virtual private networks which form network tunnels to one or more other multicasting appliances 449, 451, 453, 455, 457 which connect to one or more PSTN gateways typically located in geographically dispersed areas.

For the purpose of the illustration of FIG. 4, PSTN group #1 412 is audio conferencing with PSTN client #3 414 and PSTN client #5 416, each of which are audio conferencing with Audio/Video client group #4 415. In the illustration of FIG. 4, each member of audio/video client group #4 share audio with all the clients and video with each other. One example may be illustrated again referring to FIG. 4. If telephone client #5 416 is talking, the analog audio is converted from switched network (PSTN) to IP in the VoIP/PSTN gateway 475. The digital IP is routed via Internet to an appliance 455 at the edge of the network typically co-located with the VoIP/PSTN gateway 475. The appliance has been configured to have a virtual private network creating a tunnel through Internet to appliance 453 which also has Internet-based virtual private tunnels to appliance 457 and appliance 447. Audio from PSTN client #5 416 is broadcast from appliance 457 whereby all the audio/video client PC's of group #4 are "listeners" and receive the audio from PSTN client 416 at the same time. Additionally, PSTN client #5's 416 audio is routed over another virtual private network to one or more appliances in this case appliances 447 and 449. PSTN Client group #1 412 are also "listeners" of the multicast group as well as PSTN Client #3 414. Thus, audio is broadcast to multiple audio devices in both IP networks and the PSTN using a unique group address and a virtual private network structure. Interactivity is gained by using the same process no matter who in the group is the broadcaster of audio or video.

Figure 5:
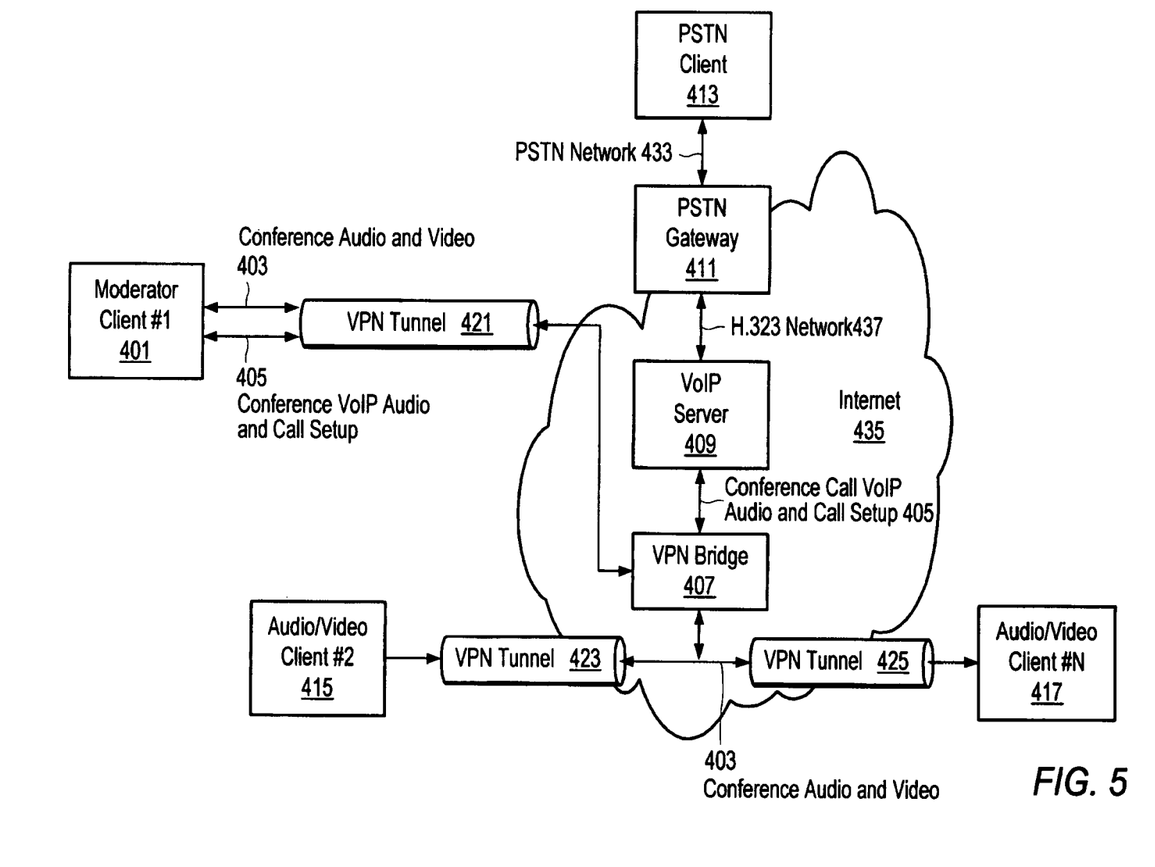
FIG. 5 illustrates the audio and video data flow over hybrid networks.

FIG. 5 shows a more detailed block diagram of the embodiment of the present invention. The moderator client #1 401 initiates the call using the application code running on the voice over IP server 409. Call initiation and call transfer may be accomplished through a VPN tunnel 421 connected to the moderator client 401. Two connections to the Moderator client #1 401 through the VPN tunnel 421 are established. The first connection connects the VoIP conference data for call initiation, set-up and control 405. The second connection 403 through the VPN tunnel connects the conference audio and video 403 between the moderator client 401 and multiple remote clients 415, 417, 413 connected to the Internet. The VPN tunnel 421 is connected into the VPN bridge 407 which may be located within the Internet 435 at either local or remote sites. As indicated in FIG. 5, the VPN bridge 407 is responsible for connecting and establishing the virtual private network used for secure conferencing. In the embodiment of the present invention the VPN bridge 407 bridges all the tunnels for data transfer. Thus, VPN tunnel 421, VPN tunnel 423 and VPN tunnel 425 are on the same virtual private network. Alternate embodiments may include a plethora of tunnels connected to through a single VPN bridge or multiple VPN bridges based on scalability of the system. An additional tunnel containing the conference voice over IP audio and call set-up data 405 is connected to a separate voice over IP server 409. The server 409 is responsible for transcoding the voice over IP audio and call set-up control 405 in preparation for data transfer across the H.323 network 437. The H.323 network 437 traverses across the Internet to one of many PSTN gateways 411. PSTN gateways 411 form the bridge between the Internet and the public switched telephone network 433. These VoIP gateways are typically located at the local exchange carrier (LEC) in a plethora of individual points of presence throughout the world. Audio telephony calls are terminated at the voice over IP client 413. These termination points may be located throughout the world. Thus, the embodiment shown in FIG. 5 allows for the dial-out to standard phones from a client terminal with audio and video capability over IP networks allowing conferencing between multiple remote sites including secure voice over IP audio components over the PSTN.

Figure 6:
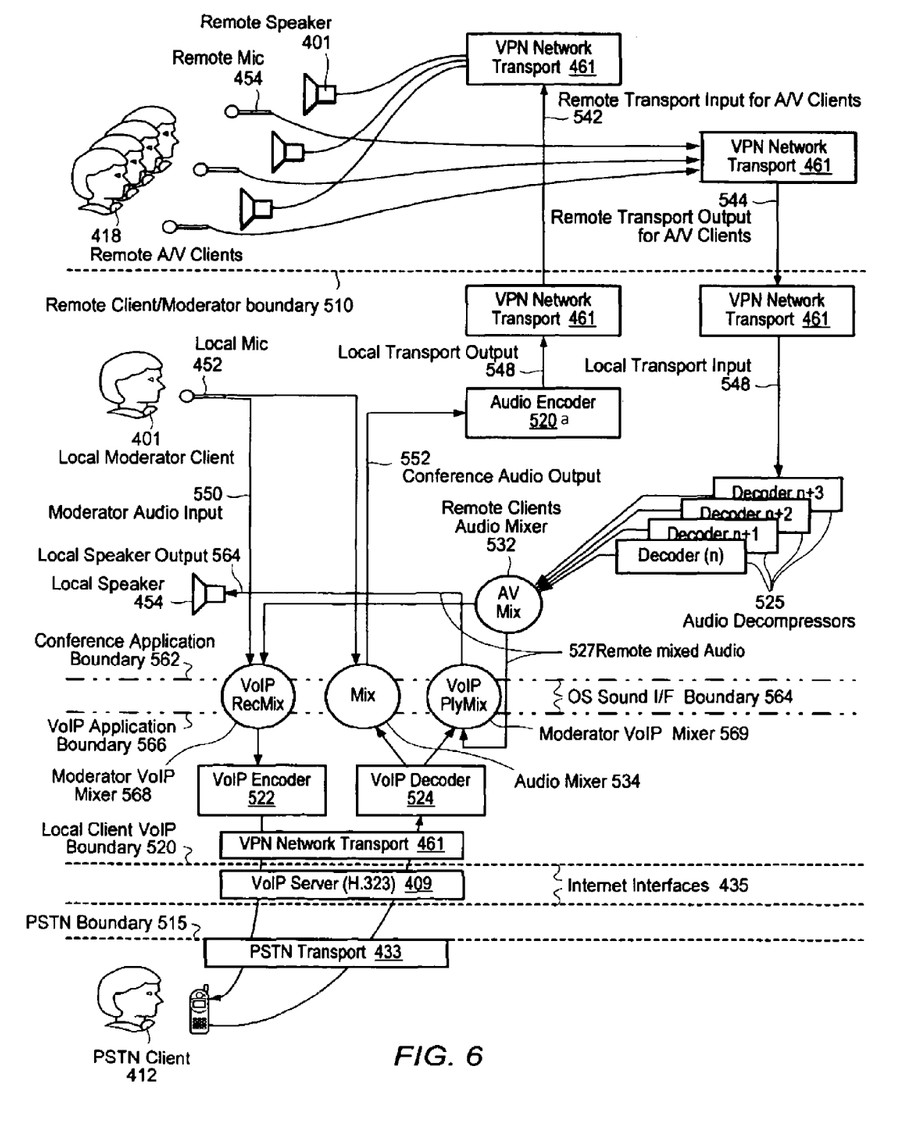
FIG. 6 illustrates the local client data mixing used in the preferred embodiment.

FIG. 6 of the preferred embodiment shows the multiple network domains, the software applications and operating system boundaries and the operations necessary for audio manipulation and transport. It is noted that video accompanies the audio to all conference participants with the exception of the PSTN client 412. For simplicity of illustration, FIG. 6 does not show the video conferencing path. The embodiment of FIG. 6 includes a local moderator client 401 who is responsible for initiating a dial out for audio conferencing to the PSTN client 412. The local moderator client 401 may also be the initiator of the meeting. In this exemplary embodiment, it may be assumed that the local moderator client 401 has set up the audio video conference with remote audio video clients 418 previous to the dial out for audio conferencing to the PSTN client 412. The local moderator 401 and the remote audio video clients 418 may share audio and video data in a full duplex mode among to all participants with the exception of the PSTN client 412. The PSTN client 412 may share audio from a standard telephone or wireless telephone with all participants in the conference including the local client 401 and remote audio video clients 418. Likewise, the remote audio video clients 418 and the local moderator client 401 may share audio with the remote PSTN client 412. Thus, as indicated in FIG. 6, a voice over IP call placed the standard telephone system may bring a remote telephone user into an audio/video conference with multiple remote participants.

A detailed description of FIG. 6 follows. It may be assumed in this embodiment that the functions and features of FIG. 6 are running on general-purpose hardware using various software to accomplish the tasks at hand. In alternate embodiments various pieces of FIG. 6 may be encompassed in specialized hardware for improved speed performance. Again referring to FIG. 6 and starting with the local moderator client 401, the process of call set-up is first performed. The local moderator client 401 uses a computer terminal connected to a local area network that in turn is connected to a wide area network and preferably then connected to a virtual private network 461. The local moderator client 401 is equipped with proprietary software, as depicted in FIG. 6, to operate as a dial-out to PSTN application. The application interface allows a point-and-click interface establishing the dial out phone numbers to various possible clients on the PSTN 433. In alternate embodiments "Dial-In" may be used in addition using the same techniques outlined but in a reverse path scenario.

Once the local moderator client 401 has selected the remote PSTN client 412 phone number, a point and click on the name initiates the dial-out process where audio information is to be transport across hybrid networks. General tones, as known in the art according to the ITT standard, are sent from the local moderators computer or terminal to the voice over IP server 409 located somewhere within a global Internet system 435. The voice over IP server 409 may be connected to a virtual private network 461. The voice over IP server 409 may use standard H.323 or SIP network protocol to establish communications as known directly to the PSTN gateway 433. Once the call set-up is complete both the PSTN client 412 and the local moderator client 401 have established a connection. In one embodiment the connection is not established for all the audio participants within the conference at this time. In the embodiment of FIG. 6 it is assumed that all the remote audio video clients 418 had previously been in a conference with the local moderator client 401. In alternate embodiments the order at which callers are established may be different. With the foregoing assumption of a conference being established prior to the call-out to PSTN, further definition of the VoIP audio path is specified. The following discloses and further defines the audio paths through three layers of application software 562, 564, 566, including the audio paths through four hybrid network boundaries 510, 520, 435, and 515.

Starting with the remote client/moderator boundary 510 preceding to the local client voice over IP boundary 520, the Internet interface boundaries 435 and the PSTN telephone network boundary 515, each of these distinct boundaries makes up the method used to transport audio media in a hybrid mixed network system. Remote client/moderator boundary 510 may be established as a virtual private network for transport of audio and video data between the local moderator client 401 and remote audio/video clients 418. In alternate embodiments the virtual private network may be replaced with either switched dedicated network or standard non-secure IP networks. The local clients VoIP boundary 520 may also be a virtual private network connecting audio from the local moderator client 401 to a local or remote voice over IP server 409. In alternate embodiments the local client voice over IP boundary may be established through switched networks or the open Internet. For security purposes all connections that traverse across the open Internet 435 are preferably secured by the use of encryption running within a virtual private network. Alternate embodiments may exclude encryption and virtual private networks including public non-encrypted information, public Internet interfaces or over private switched networks. Continuing with the description of the Internet interface 435, it is assumed all the information above the PSTN boundary 515 (as indicated in FIG. 6) is information which travels within local client local area networks, remote client local area networks, or on wide area networks through the Internet. The final boundary for network transport is the PSTN boundary 515. This is the transport interface between the wide area network (Internet) and gateways that transmit data to and from the PSTN system 433.

Again referring to FIG. 6 and assuming the PSTN dial out call has been established as known in the art, (preferred to ITD H.323) the following detailed information regarding the audio processing follows. In one embodiment the interface between the conference application boundary 562 and the operating system interface boundary 564 and the voice over to IP application boundary 566 is taken under consideration. Preferably, the operations performed on the audio occur in real time to achieve full duplex operation. In alternate embodiments a plethora of alternative methods, operating systems application software, and input and output devices may be used to achieve the same goal as described previously. In one embodiment the operating system sound interface and API boundaries 564 are used for standard audio mixing. The audio from the local moderator client 401 is preferably mixed to be transported both to the PSTN client 412 and remote audio video clients 418. The conference application boundary 562 is responsible for the application which controls mixing of audio to the operating system sound interface 564. In one embodiment, the operating system sound interface also performs the interface and mixing for the voice over IP application boundary 566. These layers make up the application interface for achieving the operation as described herein. Input from the local moderator client 401 is input to two mixers. First, the moderator audio input 550 is connected to the voice over IP record mixer 568. Secondly, the microphone from the moderator client 401 is also connected to another standard mixture 534. The voice over IP record mixer 568 mixes the audio from the audio decompressors 525 and the local moderator audio 401 in preparation for transport to the voice over IP encoder 522. In addition, the local moderator client 401 sends audio to the audio mixer 534 which mixes the audio from the voice over IP decoder 524 for output to the conference applications 562 local audio encoder 520a. The audio encoder 520a combines the PSTN client 412 audio with the local moderator clients 401 audio then encodes the result for compression of the data in preparation for transport across the VPN network 461. The application software audio encoder 520*a* delivers both the PSTN client's audio and the local moderator client's audio to remote audio video clients 418.

The local moderator client 401 receives audio from the PSTN client 412, and thus the voice over IP player mixer 569 mixes audio previously decoded by the voice over IP decoder 524 with the audio from the remote client's 418 for presentation to the local speaker 454. All the remote audio video clients 418 hear the audio from the PSTN client 412. The PSTN client 412 transports audio through the PSTN 433 to Internet-based voice over IP server 409. The voice over IP server transcodes the audio data into a format suitable for transport onto the VoIP application boundary 566. FIG. 6 also depicts how audio data from the remote audio video clients 418 is prepared for transport across a VPN network 461. This audio data is input to the application's local decoders for audio decompression 525 prior to the mixing process. The remote audio video clients 418 audio is mixed with the local moderator client audio 401 in preparation for compression by the VoIP encoder 522. This audio data is then placed in the virtual private network tunnel for transport to the voice over IP server 409 and onto the gateway for audio presentation to the PSTN, terminating at the PSTN client 412.

FIG. 6 outlines multiple application software boundaries used to mix audio between local and remote clients in hybrid data networks as indicated by the multiple protocol boundaries 562, 564, 566. Thus, the embodiment allows enhancements to the ability for audio video conferencing with multiple clients and the added value of dialing out to a remote telephone user located somewhere within the global dial-up network 450 (shown in FIG. 3). Prior art techniques, such as that known in the ITU H.323 recommendations, have the compressor 522 and decompressors 524 located within the VoIP server running the H.323 network system as indicated in FIG. 2 (audio codec 211). This poses a problem for low bit-rate networks especially when video and audio are already part of the transport data. The present embodiment uses highly compressed audio that is compressed and decompressed at the client computer. Thus, the voice over IP server can be located anywhere within the Internet 435 without concern about the limited bandwidth of the first and last mile. In addition, only a single server is required for multiple conferences. The prior art systems, as shown in FIG. 1, place at least one or more voice over IP server behind the firewall and corporate router for transcoding information to the H.323 network. This requires additional cost when a separate server is needed in each location to run the H.323 standard. The present embodiment does not require a separate server at each site, but instead requires that the desktop computer or terminal compress the data prior to transport.

We claim:

1. A method for supporting a multi-participant audio/video conference call, the method comprising:
   receiving first audio data from a Public Switched Telephone Network (PSTN) client;
   receiving second audio data from a moderator;
   receiving third audio data, video data, and collaboration data from at least one remote client through a first Virtual Private Network (VPN) tunnel;
   mixing the first audio data from the PSTN client with the second audio data from the moderator into a first mixed audio data;
   transmitting the first mixed audio data to the remote client through the first VPN tunnel;
   mixing the second audio data from the moderator with the third audio data from the remote client into a second mixed audio data; and
   transmitting the second mixed audio data to the PSTN client.

2. The method of claim 1 further comprising:
   mixing the first audio data from the PSTN client with the third audio data from the remote client into a third mixed audio data; and
   playing the third mixed audio data to the moderator.

3. The method of claim 1 wherein the receiving first audio data from the PSTN client includes receiving IP packets and decoding the IP packets containing the first audio data from the PSTN client at a moderator computer system.

4. The method of claim 1 wherein the receiving third audio data from the remote client includes receiving IP packets containing the third audio data corresponding to the remote client and decoding the IP packets containing the third audio data from the remote client.

5. The method of claim 1 wherein the data communicated between the moderator and the PSTN client is transported through a second VPN tunnel.

6. The method of claim 1 further comprising encoding the first mixed audio data into a first compressed audio data before transmitting the first mixed audio data to the remote client.

7. The method of claim 1 further comprising VoIP encoding the second mixed audio data before transmitting the second mixed audio data to the PSTN client.

8. A system for supporting a multi-participant audio/video conference call comprising:
   a first mixer configured to mix audio data from a Public Switched Telephone Network (PSTN) client with audio data from a moderator and collaboration data from the moderator into a mixed data;
   a transport output configured to transmit the first mixed data to at least one remote client through a first Virtual Private Network (VPN) tunnel;
   a second mixer configured to mix audio data from the moderator with audio data from the remote client connected to the Internet into a first mixed audio data; and
   a VoIP encoder to encode the first mixed audio data into a compressed audio data;
   the transport output further configured to transmit the compressed audio data to the PSTN client through the first VPN tunnel.

9. The system of claim 8 further comprising:
   a third mixer configured to mix the audio data from the PSTN client with the audio data from the remote client into a second mixed audio data; and
   a speaker configured to play the second mixed audio data to the moderator.

10. The system of claim 8 further comprising a VoIP decoder configured to receive IP packets containing the audio data from the PSTN client, and further configured to decode the IP packets containing the audio data from the PSTN client.

11. The system of claim 8 further comprising at least one audio decompressor configured to decode IP packets containing the audio data from the remote client.

12. The system of claim 8 further comprising an encoder configured to encode the mixed data into a compressed data before transmitting the compressed data to the remote client.

* * * * *

UNITED STATES PATENT AND TRADEMARK OFFICE
CERTIFICATE OF CORRECTION

PATENT NO. : 9,253,332 B2
APPLICATION NO. : 13/674227
DATED : February 2, 2016
INVENTOR(S) : Thomas Dye et al.

It is certified that error appears in the above-identified patent and that said Letters Patent is hereby corrected as shown below:

<u>Title Page 2, Item (56) References Cited, Other Publications</u>:
Column 2, line 53: change "Architecure" to -- Architecture --; and
Column 2, line 67: change "vol. 8" to -- vol. 6 --.

Signed and Sealed this
Second Day of August, 2016

Michelle K. Lee
*Director of the United States Patent and Trademark Office*